United States Patent
Sasaki et al.

(10) Patent No.: US 12,355,031 B2
(45) Date of Patent: Jul. 8, 2025

(54) BATTERY

(71) Applicant: Panasonic Intellectual Property Management Co., Ltd., Osaka (JP)

(72) Inventors: Izuru Sasaki, Aichi (JP); Tatsuya Oshima, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 583 days.

(21) Appl. No.: 17/701,684

(22) Filed: Mar. 23, 2022

(65) Prior Publication Data

US 2022/0216509 A1     Jul. 7, 2022

Related U.S. Application Data

(63) Continuation of application No. PCT/JP2020/037792, filed on Oct. 6, 2020.

(30) Foreign Application Priority Data

Oct. 18, 2019  (JP) .................. 2019-190699

(51) Int. Cl.
  *H01M 10/0562* (2010.01)
  *H01M 10/0525* (2010.01)
  (Continued)

(52) U.S. Cl.
  CPC ... *H01M 10/0562* (2013.01); *H01M 10/0525* (2013.01); *H01M 10/0585* (2013.01);
  (Continued)

(58) Field of Classification Search
  CPC ......... H01M 10/0562; H01M 10/0525; H01M 50/431; H01M 50/457; H01M 2300/0068; H01M 2300/008; H01M 2300/0094
  See application file for complete search history.

(56) References Cited

U.S. PATENT DOCUMENTS

2019/0088995 A1    3/2019  Asano et al.
2020/0020895 A1*   1/2020  Collins ............ H01M 10/0525
2020/0144575 A1*   5/2020  Ku .................. H01M 10/0562

FOREIGN PATENT DOCUMENTS

JP   2003-217663    7/2003
JP   2006-244734    9/2006
(Continued)

OTHER PUBLICATIONS

International Search Report of PCT application No. PCT/JP2020/037792 dated Dec. 28, 2020.

*Primary Examiner* — Laura Weiner
(74) *Attorney, Agent, or Firm* — Rimon P.C.

(57) ABSTRACT

A battery includes a positive electrode, a first electrolyte layer, a second electrolyte layer, a third electrolyte layer, and a negative electrode, which are arranged in the order stated. The first electrolyte layer includes a first solid electrolyte material. The second electrolyte layer includes a second solid electrolyte material. The third electrolyte layer includes a third solid electrolyte material. The second solid electrolyte material has a Young's modulus that is less than a Young's modulus of the first solid electrolyte material and less than a Young's modulus of the third solid electrolyte material. The first solid electrolyte material and the third solid electrolyte material are materials different from each other.

5 Claims, 1 Drawing Sheet

(51) Int. Cl.
*H01M 10/0585* (2010.01)
*H01M 50/431* (2021.01)
*H01M 50/457* (2021.01)

(52) U.S. Cl.
CPC ....... *H01M 50/431* (2021.01); *H01M 50/457* (2021.01); *H01M 2300/0068* (2013.01); *H01M 2300/0071* (2013.01); *H01M 2300/008* (2013.01); *H01M 2300/0094* (2013.01)

(56) References Cited

FOREIGN PATENT DOCUMENTS

| | | |
|---|---|---|
| JP | 2010-073631 | 4/2010 |
| JP | 2014-216131 | * 11/2014 |
| JP | 2018-040716 | 3/2018 |
| WO | 2018/025582 | 2/2018 |

* cited by examiner

BATTERY

BACKGROUND

1. Technical Field

The present disclosure relates to a battery.

2. Description of the Related Art

Japanese Unexamined Patent Application Publication No. 2014-216131 discloses an all-solid-state battery in which a positive electrode layer, a first crystal electrolyte layer, a glass electrolyte layer, a second crystal electrolyte layer, and a negative electrode layer are stacked in the order stated.

SUMMARY

One non-limiting and exemplary embodiment provides a battery having improved power characteristics.

In one general aspect, the techniques disclosed here feature a battery including a positive electrode, a first electrolyte layer, a second electrolyte layer, a third electrolyte layer, and a negative electrode arranged in the order stated. The first electrolyte layer includes a first solid electrolyte material. The second electrolyte layer includes a second solid electrolyte material. The third electrolyte layer includes a third solid electrolyte material. The second solid electrolyte material has a Young's modulus that is less than a Young's modulus of the first solid electrolyte material and less than a Young's modulus of the third solid electrolyte material. The first solid electrolyte material and the third solid electrolyte material are materials different from each other.

With the present disclosure, the power characteristics of a battery are improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Overview of Aspects of Present Disclosure

Figure 1:
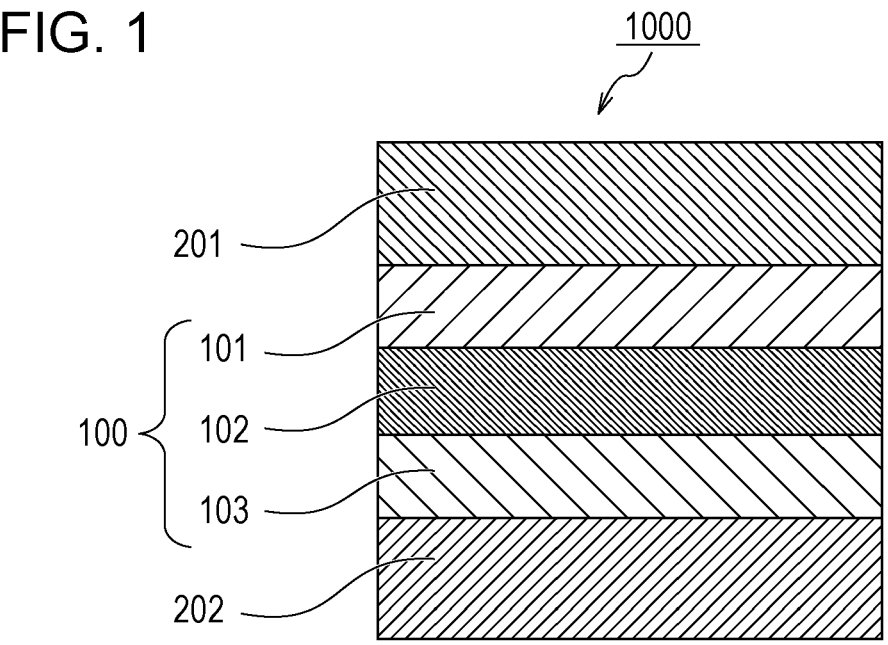
FIG. 1 is a cross-sectional view illustrating a general configuration of a battery according to a first embodiment.

According to a first aspect of the present disclosure, a battery includes a positive electrode, a first electrolyte layer, a second electrolyte layer, a third electrolyte layer, and a negative electrode arranged in the order stated, in which
  the first electrolyte layer includes a first solid electrolyte material,
  the second electrolyte layer includes a second solid electrolyte material,
  the third electrolyte layer includes a third solid electrolyte material,
  the second solid electrolyte material has a Young's modulus that is less than a Young's modulus of the first solid electrolyte material and less than a Young's modulus of the third solid electrolyte material, and
  the first solid electrolyte material and the third solid electrolyte material are materials different from each other.

With regard to the first aspect, the power characteristics of the battery are improved.

In a second aspect of the present disclosure, the battery according to the first aspect may be one in which, for example, the second electrolyte layer has a thickness that is less than a thickness of the first electrolyte layer and less than a thickness of the third electrolyte layer. With this configuration, resistance of the second electrolyte layer is reduced, and, consequently, the power characteristics of the battery are improved.

In a third aspect of the present disclosure, the battery according to the first or second aspect may be one in which, for example, the first solid electrolyte material includes Li, M1, and X1, where M1 is at least one selected from the group consisting of metalloid elements and metal elements other than Li, and X1 is at least one selected from the group consisting of F, Cl, Br, and I.

In a fourth aspect of the present disclosure, the battery according to the third aspect may be one in which, for example, the first solid electrolyte material is a material represented by $Li_{\alpha 1}M1_{\beta 1}X1_{\gamma 1}$, denoted as composition formula (1), where $\alpha 1$, $\beta 1$, and $\gamma 1$ are each a value greater than 0.

In a fifth aspect of the present disclosure, the battery according to the third or fourth aspect may be one in which, for example, M1 includes yttrium.

With regard to the third to fifth aspects, ionic conductivity of the first solid electrolyte material is improved.

In a sixth aspect of the present disclosure, the battery according to any one of the first to fifth aspects may be one in which, for example, the second solid electrolyte material is an inorganic solid electrolyte. With this configuration, the power characteristics of the battery are improved.

In a seventh aspect of the present disclosure, the battery according to any one of the first to sixth aspects may be one in which, for example, the second solid electrolyte material includes Li, M2 and X2, where M2 is at least one selected from the group consisting of metalloid elements and metal elements other than Li, and X2 is at least one selected from the group consisting of F, Cl, Br, and I.

In an eighth aspect of the present disclosure, the battery according to the seventh aspect may be one in which, for example, the second solid electrolyte material is a material represented by $Li_{\alpha 2}M2_{\beta 2}X2_{\gamma 2}$, denoted as composition formula (2), where $\alpha 2$, $\beta 2$, and $\gamma 2$ are each a value greater than 0.

In a ninth aspect of the present disclosure, the battery according to the seventh or eighth aspect may be one in which, for example, M2 includes yttrium.

With regard to the seventh to ninth aspects, ionic conductivity of the second solid electrolyte material is improved.

In a tenth aspect of the present disclosure, the battery according to any one of the first to ninth aspects may be one in which, for example, the third solid electrolyte material is a sulfide solid electrolyte. With this configuration, the power characteristics of the battery are improved.

In an eleventh aspect of the present disclosure, the battery according to any one of the first to ninth aspects may be one in which, for example, the third solid electrolyte material includes Li, M3 and X3, where M3 is at least one selected from the group consisting of metalloid elements and metal elements other than Li, and X3 is at least one selected from the group consisting of F, Cl, Br, and I.

In a twelfth aspect of the present disclosure, the battery according to the eleventh aspect may be one in which, for example, the third solid electrolyte material is a material represented by $Li_{\alpha 3}$, $M3_{\beta 3}X3_{\gamma 3}$, denoted as composition formula (3), where α3. β3, and γ3 are each a value greater than 0.

In a thirteenth aspect of the present disclosure, the battery according to the eleventh or twelfth aspect may be one in which, for example, M3 includes yttrium.

With regard to the eleventh to thirteenth aspects, ionic conductivity of the third solid electrolyte material is improved.

In a fourteenth aspect of the present disclosure, the battery according to any one of the first to thirteenth aspects may be one in which, for example, the first solid electrolyte material contains at least one selected from the group consisting of F, Cl, Br, and I; the second solid electrolyte material contains at least one selected from the group consisting of F, Cl, Br, and I; the third solid electrolyte material contains at least one selected from the group consisting of F, Cl, Br, and I; and a relationship of (R3+R4)>(R1+R2) and a relationship of (R3+R4)>(R5+R6) are satisfied, where R1 is defined as a ratio of an amount of substance of Br to a total amount of substance of at least one halogen in the first solid electrolyte material, R2 is defined as a ratio of an amount of substance of I to the total amount of substance of the at least one halogen in the first solid electrolyte material, R3 is defined as a ratio of an amount of substance of Br to a total amount of substance of at least one halogen in the second solid electrolyte material, R4 is defined as a ratio of an amount of substance of I to the total amount of substance of the at least one halogen in the second solid electrolyte material, R5 is defined as a ratio of an amount of substance of Br to a total amount of substance of at least one halogen in the third solid electrolyte material, and R6 is defined as a ratio of an amount of substance of I to the total amount of substance of the at least one halogen in the third solid electrolyte material. With this configuration, adhesion between the different types of solid electrolyte layers is improved, and, therefore, delamination is inhibited.

An embodiment of the present disclosure will now be described with reference to the drawings.

First Embodiment

FIG. 1 is a cross-sectional view illustrating a general configuration of a battery 1000, according to a first embodiment.

The battery 1000 includes a positive electrode 201, a first electrolyte layer 101, a second electrolyte layer 102, a third electrolyte layer 103, and a negative electrode 202, which are arranged in the order stated. The positive electrode 201, the first electrolyte layer 101, the second electrolyte layer 102, the third electrolyte layer 103, and the negative electrode 202 are stacked in the order stated. An electrolyte layer 100 includes the first electrolyte layer 101, the second electrolyte layer 102, and the third electrolyte layer 103. The electrolyte layer 100 is disposed between the positive electrode 201 and the negative electrode 202. The first electrolyte layer 101 includes a first solid electrolyte material. The second electrolyte layer 102 includes a second solid electrolyte material. The third electrolyte layer 103 includes a third solid electrolyte material. The second electrolyte material has a Young's modulus that is less than a Young's modulus of the first solid electrolyte material and less than a Young's modulus of the third solid electrolyte material. The first solid electrolyte material and the third solid electrolyte material are materials different from each other. With this configuration, the power characteristics of the battery 1000 are improved.

The electrolyte layer 100 has a multi-layer structure. Accordingly, in the electrolyte layer 100, it is possible to use an electrolyte layer that includes a solid electrolyte material having low oxidation resistance and an electrolyte layer that includes a solid electrolyte material having low reduction resistance. For example, in the first electrolyte layer 101, a solid electrolyte material having low reduction resistance may be used. For example, in the third electrolyte layer 103, a solid electrolyte material having low oxidation resistance may be used. With this configuration, internal resistance of the electrolyte layer is reduced, and, consequently, the power characteristics of the battery 1000 are improved.

Japanese Unexamined Patent Application Publication No. 2014-216131 discloses an all-solid-state battery in which a positive electrode layer, a first crystal electrolyte layer, a glass electrolyte layer, a second crystal electrolyte layer, and a negative electrode layer are stacked in the order stated. Japanese Unexamined Patent Application Publication No. 2014-216131 states that the glass electrolyte layer becomes crushed in press forming, and as a result, interlayer adhesion is improved. Japanese Unexamined Patent Application Publication No. 2014-216131 does not mention a problem that can occur in an instance in which two or more solid electrolyte layers including different types of solid electrolyte materials are stacked and bonded together.

The present inventors performed studies and, consequently, made the following discoveries. In instances where solid electrolyte layers including different types of solid electrolyte materials that have different compressive properties are stacked and compressed to form a stacked body of different types of solid electrolyte layers, delamination occurs due to residual stress between the different types of solid electrolyte layers. In this case, the power characteristics of a battery deteriorate. This problem can be solved by disposing an intermediate layer between the different types of solid electrolyte layers. The intermediate layer includes a solid electrolyte material having a Young's modulus that is less than a Young's modulus of each of the solid electrolyte materials included in the respective different types of solid electrolyte layers. That is, providing an intermediate layer including a solid electrolyte material that has a low Young's modulus improves adhesion between the different types of solid electrolyte layers and, therefore, inhibits delamination. This improves the power characteristics of a battery.

In the first electrolyte layer 101, the first solid electrolyte material may be present as a major component. In the second electrolyte layer 102, the second solid electrolyte material may be present as a major component. In the third electrolyte layer 103, the third solid electrolyte material, which is different from the first solid electrolyte material, may be present as a major component. A percentage of a mass of the first solid electrolyte material relative to a mass of the first electrolyte layer 101 may be, for example, greater than or equal to 50 mass %, or greater than or equal to 70 mass %. A percentage of a mass of the second solid electrolyte material relative to a mass of the second electrolyte layer 102 may be, for example, greater than or equal to 50 mass %, or greater than or equal to 70 mass %. A percentage of a mass of the third solid electrolyte material relative to a mass of the third electrolyte layer 103 may be, for example, greater than or equal to 50 mass %, or greater than or equal to 70 mass %.

The first solid electrolyte material included in the first electrolyte layer 101 may be at least one selected from a first group consisting of solid electrolyte materials. The first electrolyte layer 101 may have a single-layer structure or a multi-layer structure. For example, in instances where the first electrolyte layer 101 is formed of a plurality of layers, the layers may have different compositions.

The second solid electrolyte material included in the second electrolyte layer 102 may be at least one selected from a second group consisting of solid electrolyte materials. The second electrolyte layer 102 may have a single-layer structure or a multi-layer structure. For example, in instances where the second electrolyte layer 102 is formed of a plurality of layers, the layers may have different compositions.

The third solid electrolyte material included in the third electrolyte layer 103 may be at least one selected from a third group consisting of solid electrolyte materials. The third electrolyte layer 103 may have a single-layer structure or a multi-layer structure. For example, in instances where the third electrolyte layer 103 is formed of a plurality of layers, the layers may have different compositions.

The third solid electrolyte material is a material having a composition different from a composition of the first solid electrolyte material. In this instance, compositions of the first solid electrolyte materials included in the first group are different from compositions of the third solid electrolyte materials included in the third group. However, the first electrolyte layer 101 may partially include a solid electrolyte material having the same composition as a solid electrolyte material of the third electrolyte layer 103. A solid electrolyte material that may be included in the first electrolyte layer 101 and also in the third electrolyte layer 103 may be present in a volume ratio of, for example, less than or equal to 50%, less than or equal to 30%, or less than or equal to 10%, relative to a volume of the first electrolyte layer 101. The third electrolyte layer 103 may partially include a solid electrolyte material having the same composition as a solid electrolyte material of the first electrolyte layer 101. A solid electrolyte material that may be included in the third electrolyte layer 103 and also in the first electrolyte layer 101 may be present in a volume ratio of, for example, less than or equal to 50%, less than or equal to 30%, or less than or equal to 10%, relative to a volume of the third electrolyte layer 103.

The second solid electrolyte material included in the second electrolyte layer 102 may have a Young's modulus that is less than a Young's modulus of the first solid electrolyte material included in the first electrolyte layer 101 and less than a Young's modulus of the third solid electrolyte material included in the third electrolyte layer 103.

In the instance where an intermediate layer including a solid electrolyte material that has a low Young's modulus is disposed between the different types of solid electrolyte layers, that is, an intermediate layer including a solid electrolyte material that has a low Young's modulus is provided, residual stress between the different types of solid electrolyte layers is alleviated. Consequently, adhesion between the different types of solid electrolyte layers is improved, and, therefore, delamination is inhibited. As a result, a battery 1000 having excellent power characteristics can be obtained.

The Young's modulus of the solid electrolyte materials may be measured by using any suitable method. For example, a nanoindentation method may be used. Specifically, the Young's modulus of a microscopic region can be determined by pressing the indenter of a nanoindenter into a solid electrolyte material and measuring an amount of displacement of the indenter resulting from the application of a load to the solid electrolyte material. Alternatively, for example, an ultrasonic pulser/receiver may be used.

Solid Electrolyte Material

In the present disclosure, "metalloid elements" are B, Si, Ge, As, Sb, and Te. In the present disclosure, "metal elements" are all the elements from Group 1 to Group 12 of the periodic table excluding hydrogen and also are all the elements from Group 13 to Group 16 of the periodic table excluding B, Si, Ge, As, Sb, Te, C, N, P, O, S and Se. That is, the "metalloid elements" and the "metal elements" are elements that can become a cation in instances in which the element forms an inorganic compound with a halogen element.

The first solid electrolyte material may be a material that contains Li, M1, and X1. The element M1 is at least one selected from the group consisting of metalloid elements and metal elements other than Li. The element X1 is at least one selected from the group consisting of F, Cl, Br, and I. With any of these configurations, ionic conductivity of the first solid electrolyte material is improved. Consequently, the power characteristics of the battery 1000 are improved. Furthermore, thermal stability of the battery 1000 is improved. In instances where the first solid electrolyte material does not contain sulfur, generation of hydrogen sulfide can be inhibited.

The first solid electrolyte material may be, for example, a material represented by composition formula (1) below.

$$Li_{\alpha 1}M1_{\beta 1}X1_{\gamma 1} \quad \text{formula (1)}$$

In the formula, α1, β1, and γ1 are each a value greater than 0. γ1 may be, for example, 4, 6, or the like. With any of these configurations, the ionic conductivity of the first solid electrolyte material is improved. Consequently, the power characteristics of the battery 1000 are improved.

The second solid electrolyte material may include an inorganic solid electrolyte. The second solid electrolyte material may be an inorganic solid electrolyte. With either of these configurations, resistance of the second electrolyte layer 102 is reduced, and, consequently, the power characteristics of the battery 1000 are improved.

The second solid electrolyte material may be a material that contains Li, M2, and X2. The element M2 is at least one selected from the group consisting of metalloid elements and metal elements other than Li. The element X2 is at least one selected from the group consisting of F, Cl, Br, and I. With any of these configurations, ionic conductivity of the second solid electrolyte material is improved. Consequently, the power characteristics of the battery 1000 are improved. Furthermore, the thermal stability of the battery 1000 is improved. In instances where the second solid electrolyte material does not contain sulfur, generation of hydrogen sulfide can be inhibited.

The second solid electrolyte material may be, for example, a material represented by composition formula (2) below.

$$Li_{\alpha 2}M2_{\beta 2}X2_{\gamma 2} \quad \text{formula (2)}$$

In the formula, α2, β2, and γ2 are each a value greater than 0. γ2 may be, for example, 4, 6, or the like. With any of these configurations, the ionic conductivity of the second solid electrolyte material is improved. Consequently, the power characteristics of the battery 1000 are improved.

The third solid electrolyte material may be a sulfide solid electrolyte material. In the present disclosure, the "sulfide solid electrolyte" is a solid electrolyte containing sulfur. Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Furthermore, LiX, $Li_2O$, $MO_q$, $Li_pMO_q$, and/or the like may be added to any of the foregoing sulfide solid electrolytes. The element X is at least one selected from the group consisting of F, Cl, Br, and I. The element M is at least one selected from the group consisting of P, Si, Ge, B, Al, Ga, In, Fe, and Zn. p and q are each a natural number. With any of these configurations, the power characteristics of the battery 1000 are improved. One or more sulfide solid electrolytes selected from the above-mentioned materials may be used.

The third solid electrolyte material may be a material that contains Li, M3, and X3. The element M3 is at least one selected from the group consisting of metalloid elements and metal elements other than Li. The element X3 is at least one selected from the group consisting of F, Cl, Br, and I. With any of these configurations, ionic conductivity of the third solid electrolyte material is improved. Consequently, the power characteristics of the battery 1000 are improved. Furthermore, the thermal stability of the battery 1000 is improved. In instances where the third solid electrolyte material does not contain sulfur, generation of hydrogen sulfide can be inhibited.

The third solid electrolyte material may be, for example, a material represented by composition formula (3) below.

$$Li_{\alpha 3}M3_{\beta 3}X3_{\gamma 3} \qquad \text{formula (3)}$$

In the formula, $\alpha 3$, $\beta 3$, and $\gamma 3$ are each a value greater than 0. $\gamma 3$ may be, for example, 4, 6, or the like. With any of these configurations, the ionic conductivity of the third solid electrolyte material is improved. Consequently, the power characteristics of the battery 1000 are improved.

In composition formula (1), the element M1 may include Y (yttrium). In composition formula (2), the element M2 may include Y (yttrium). In composition formula (3), the element M3 may include Y (yttrium). That is, the first solid electrolyte material, the second solid electrolyte material, and the third solid electrolyte material may each contain Y as a metal element. With this configuration, the ionic conductivity of the solid electrolyte materials is further improved. Consequently, charge-discharge characteristics of the battery 1000 are improved.

A Y-containing first solid electrolyte material, a Y-containing second solid electrolyte material, and a Y-containing third solid electrolyte material may each be a compound represented by, for example, a composition formula of $Li_aMe_bY_cX_6$. In the formula, a+mb+3c=6, and c>0 are satisfied. The element Me is at least one selected from the group consisting of metalloid elements and metal elements excluding Li and Y. m is the valence of the element Me. The element X is at least one selected from the group consisting of F, Cl, Br, and I.

The element Me may be, for example, at least one selected from the group consisting of Mg, Ca, Sr, Ba, Zn, Sc, Al, Ga, Bi, Zr, Hf, Ti, Sn, Ta, and Nb.

The first solid electrolyte material, the second solid electrolyte material, and the third solid electrolyte material may each be any of the following materials, for example. With any of the configurations described below, the ionic conductivity of the first solid electrolyte material, the second solid electrolyte material, and the third solid electrolyte material is further improved. Consequently, the power characteristics of the battery 1000 are further improved.

The first solid electrolyte material, the second solid electrolyte material, and the third solid electrolyte material may be a material represented by composition formula (A1) below.

$$Li_{6-3d}Y_dX_6 \qquad \text{formula (A1)}$$

In composition formula (A1), the element X is at least one selected from the group consisting of Cl, Br, and I. Furthermore, 0<d<2 is satisfied.

The first solid electrolyte material, the second solid electrolyte material, and the third solid electrolyte material may be a material represented by composition formula (A2) below.

$$Li_3YX_6 \qquad \text{formula (A2)}$$

In composition formula (A2), the element X is at least one selected from the group consisting of Cl, Br, and I.

The first solid electrolyte material, the second solid electrolyte material, and the third solid electrolyte material may be a material represented by composition formula (A3) below.

$$Li_{3-\delta}Y_{1+\delta}Cl_6 \qquad \text{formula (A3)}$$

In composition formula (A3), 0<δ≤0.15 is satisfied.

The first solid electrolyte material, the second solid electrolyte material, and the third solid electrolyte material may be a material represented by composition formula (A4) below.

$$Li_{3-\delta}Y_{1+\delta}Br_6 \qquad \text{formula (A4)}$$

In composition formula (A4), 0<δ≤0.25 is satisfied.

The first solid electrolyte material, the second solid electrolyte material, and the third solid electrolyte material may be a material represented by composition formula (A5) below.

$$Li_{3-3\delta+a}Y_{1+\delta-a}Me_aCl_{6-x-y}Br_xI_y \qquad \text{formula (A5)}$$

In composition formula (A5), the element Me is at least one selected from the group consisting of Mg, Ca, Sr, Ba, and Zn. −1<δ<2, 0<a<3, 0<(3−3δ+a), 0<(1+δ−a), 0≤x≤6, 0≤y≤6, and (x+y) 6 are satisfied.

The first solid electrolyte material, the second solid electrolyte material, and the third solid electrolyte material may be a material represented by composition formula (A6) below.

$$Li_{3-3\delta}Y_{1+\delta-a}Me_aBr_xI_y \qquad \text{formula (A6)}$$

In composition formula (A6), the element Me is at least one selected from the group consisting of Al, Sc, Ga, and Bi. −1<δ<1, 0<a<2, 0<(1+δ−a), 0≤x≤6, 0≤y≤6, and (x+y)≤6 are satisfied.

The first solid electrolyte material, the second solid electrolyte material, and the third solid electrolyte material may be a material represented by composition formula (A7) below.

$$Li_{3-3\delta-a}Y_{1+\delta-a}Me_aCl_{6-x-y}Br_xI_y \qquad \text{formula (A7)}$$

In composition formula (A7), the element Me is at least one selected from the group consisting of Zr, Hf, and Ti. −1<δ<1, 0<a<1.5, 0<(3−3δ−a), 0<(1+δ−a), 0≤x≤6, 0≤y≤6, and (x+y)≤6 are satisfied.

The first solid electrolyte material, the second solid electrolyte material, and the third solid electrolyte material may be a material represented by composition formula (A8) below.

$$Li_{3-3\delta-2a}Y_{1+\delta-a}Cl_{6-x-y}Br_xI_y \qquad \text{formula (A8)}$$

In composition formula (A8), the element Me is at least one selected from the group consisting of Ta and Nb. $-1<\delta<1$, $0<a<1.2$, $0<(3-3\delta-2a)$, $0<(1+\delta-a)$, $0\leq x\leq 6$, $0\leq y\leq 6$, and $(x+y)\leq 6$ are satisfied.

Specific examples of the first solid electrolyte material, the second solid electrolyte material, and the third solid electrolyte material include $Li_3YX_6$, $Li_2MgX_4$, $Li_2FeX_4$, $Li(Al, Ga, In)X_4$, $Li_3(Al, Ga, In)X_6$. The element X is at least one selected from the group consisting of Cl, Br, and I. In the present disclosure, "(Al, Ga, In)" means at least one element selected from the group of elements in the parenthesis. That is, "(Al, Ga, In)" has the same meaning as "at least one selected from the group consisting of Al, Ga, and In". The same applies to other elements.

The first solid electrolyte material contains at least one selected from the group consisting of F, Cl, Br, and I, for example. The second solid electrolyte material contains at least one selected from the group consisting of F, Cl, Br, and I, for example. The third solid electrolyte material contains at least one selected from the group consisting of F, Cl, Br, and I, for example. In the first solid electrolyte material, R1 is defined as a ratio of an amount of substance of Br to a total amount of substance of the at least one halogen. In the first solid electrolyte material, R2 is defined as a ratio of an amount of substance of I to the total amount of substance of the at least one halogen. In the second solid electrolyte material, R3 is defined as a ratio of an amount of substance of Br to a total amount of substance of the at least one halogen. In the second solid electrolyte material, R4 is defined as a ratio of an amount of substance of I to the total amount of substance of the at least one halogen. In the third solid electrolyte material, R5 is defined as a ratio of an amount of substance of Br to a total amount of substance of the at least one halogen. In the third solid electrolyte material, R6 is defined as a ratio of an amount of substance of I to the total amount of substance of the at least one halogen. In this instance, a relationship of (R3+R4)>(R1+R2) and a relationship of (R3+R4)>(R5+R6) may be satisfied. R1, R2, R3, R4, R5 and R6 may each be zero.

When large amounts of Br and/or I are present in a solid electrolyte material, a bonding force between the anions and the cations is weak. The anions of Br and I are anions having a large ionic radius. The cations are cations of Li and cations of M. As a result, the solid electrolyte material can have a soft crystal structure. That is, when large amounts of Br and/or I are present in a solid electrolyte material, the solid electrolyte material can have a low Young's modulus. In a solid electrolyte material, the greater the sum of the ratio of the amount of substance of Br to the total amount of substance of halogens and the ratio of the amount of substance of I to the total amount of substance of halogens, the lower the Young's modulus of the solid electrolyte material. For this reason, when the relationship of (R3+R4)>(R1+R2) and the relationship of (R3+R4)>(R5+R6) are satisfied, the Young's modulus of the second solid electrolyte material is less than the Young's modulus of the first solid electrolyte material and less than the Young's modulus of the third solid electrolyte material. As a result, adhesion between the different types of solid electrolyte layers can be improved, and, therefore, delamination can be inhibited. Consequently, the power characteristics of the battery 1000 are improved.

When the first solid electrolyte material is, for example, a material represented by $Li_3YCl_{6-x1-y1}Br_{x1}I_{y1}$, R1 is expressed as R1=x1/6, and R2 is expressed as R2=y1/6. When the second solid electrolyte material is, for example, a material represented by $Li_3YCl_{6-x2-y2}Br_{x2}I_{y2}$, R3 is expressed as R3=x2/6, and R4 is expressed as R4=y2/6. When the third solid electrolyte material is, for example, a material represented by $Li_3YCl_{6-x3-y3}Br_{x3}I_{y3}$, R5 is expressed as R5=x3/6, and R6 is expressed as R6=y3/6.

The Young's modulus of the solid electrolyte materials can also be varied by appropriately selecting the element that serves as M1, which is to be included in the first solid electrolyte material, the element that serves as M2, which is to be included in the second solid electrolyte material, and the element that serves as M3, which is to be included in the third solid electrolyte material.

The Young's modulus of the first solid electrolyte material can be varied by appropriately selecting the combination of M1 and X1, which are to be included in the first solid electrolyte material. When M1 has the same ionic valence as the ionic valence of X1, and M1 has a large ionic radius, a bonding force between M1 and X1 is weak. When M1 has an ionic radius substantially equal to the ionic radius of X1, and M1 has a low ionic valence, the bonding force between M1 and X1 is weak. As a result, the first solid electrolyte material can have a soft crystal structure.

The Young's modulus of the second solid electrolyte material can be varied by appropriately selecting the combination of M2 and X2, which are to be included in the second solid electrolyte material. When M2 has the same ionic valence as the ionic valence of X2, and M2 has a large ionic radius, a bonding force between M2 and X2 is weak. When M2 has an ionic radius substantially equal to the ionic radius of X2, and M2 has a low ionic valence, the bonding force between M2 and X2 is weak. As a result, the second solid electrolyte material can have a soft crystal structure.

The Young's modulus of the third solid electrolyte material can be varied by appropriately selecting the combination of M3 and X3, which are to be included in the third solid electrolyte material. When M3 has the same ionic valence as the ionic valence of X3, and M3 has a large ionic radius, a bonding force between M3 and X3 is weak. When M3 has an ionic radius substantially equal to the ionic radius of X3, and M3 has a low ionic valence, the bonding force between M3 and X3 is weak. As a result, the third solid electrolyte material can have a soft crystal structure.

In the first electrolyte layer 101, the first solid electrolyte material may be present as a major component, for example. That is, a mass percentage of the first solid electrolyte material relative to a total mass of the first electrolyte layer 101 may be, for example, greater than or equal to 50 mass %, or greater than or equal to 70 mass %. With either of these configurations, the charge-discharge characteristics of the battery 1000 are improved.

In the first electrolyte layer 101, the first solid electrolyte material may be present, for example, in a mass percentage of 100 mass % relative to the total mass of the first electrolyte layer 101, with the exception of the presence of unintentionally incorporated impurities. That is, the first electrolyte layer 101 may be formed of substantially only the first solid electrolyte material. With this configuration, the charge-discharge characteristics of the battery 1000 are further improved.

In the first electrolyte layer 101, the first solid electrolyte material may be present as a major component, and in addition, incidental impurities, namely, portions of the starting materials used in the synthesis of the first solid electrolyte material and by-products and decomposition products derived from the synthesis may be present.

In the second electrolyte layer 102, the second solid electrolyte material may be present as a major component, for example. That is, a mass percentage of the second solid electrolyte material relative to a total mass of the second electrolyte layer 102 may be, for example, greater than or equal to 50 mass %, or greater than or equal to 70 mass %. With either of these configurations, the charge-discharge characteristics of the battery 1000 are improved.

In the second electrolyte layer 102, the second solid electrolyte material may be present, for example, in a mass percentage of 100 mass % relative to the total mass of the second electrolyte layer 102, with the exception of the presence of unintentionally incorporated impurities. That is, the second electrolyte layer 102 may be formed of substantially only the second solid electrolyte material. With this configuration, the charge-discharge characteristics of the battery 1000 are further improved.

In the second electrolyte layer 102, the second solid electrolyte material may be present as a major component, and in addition, incidental impurities, namely, portions of the starting materials used in the synthesis of the second solid electrolyte material and by-products and decomposition products derived from the synthesis may be present.

In the third electrolyte layer 103, the third solid electrolyte material may be present as a major component, for example. That is, a mass percentage of the third solid electrolyte material relative to a total mass of the third electrolyte layer 103 may be, for example, greater than or equal to 50 mass %, or greater than or equal to 70 mass %. With either of these configurations, the charge-discharge characteristics of the battery 1000 are improved.

In the third electrolyte layer 103, the third solid electrolyte material may be present, for example, in a mass percentage of 100 mass % relative to the total mass of the third electrolyte layer 103, with the exception of the presence of unintentionally incorporated impurities. That is, the third electrolyte layer 103 may be formed of substantially only the third solid electrolyte material. With this configuration, the charge-discharge characteristics of the battery 1000 are further improved.

In the third electrolyte layer 103, the third solid electrolyte material may be present as a major component, and in addition, incidental impurities, namely, portions of the starting materials used in the synthesis of the third solid electrolyte material and by-products and decomposition products derived from the synthesis may be present.

The first solid electrolyte material, the second solid electrolyte material, and the third solid electrolyte material may each be a compound containing Li, M4, X4, and O (oxygen). The element M4 includes at least one selected from the group consisting of Nb and Ta, for example. Furthermore, the element X4 is at least one selected from the group consisting of Cl, Br, and I.

The compound containing Li, M4, X4, and O (oxygen) may be, for example, a material represented by composition formula (4) below.

$$Li_xM4O_yX4_{5+x-2y} \qquad \text{formula (4)}$$

In the formula, x may satisfy $0.1<x<7.0$, and y may satisfy $0.4<y<1.9$. With this configuration, the solid electrolyte materials have high ionic conductivity. With the use of such solid electrolyte materials, the battery 1000 can exhibit excellent charge-discharge efficiency.

At least one of the positive electrode 201 or the negative electrode 202 may include an electrolyte material, which may be, for example, a solid electrolyte material. Examples of the solid electrolyte material that may be included in the electrodes include sulfide solid electrolytes, oxide solid electrolytes, halide solid electrolytes, polymer solid electrolytes, and complex hydride solid electrolytes. Examples of the solid electrolyte material also include the first solid electrolyte material, the second solid electrolyte material, and the third solid electrolyte material.

In the present disclosure, the "oxide solid electrolyte" is a solid electrolyte containing oxygen. The oxide solid electrolyte may contain additional anions, in addition to oxygen anions. The additional anions may be anions other than those of sulfur or those of halogen elements. In the present disclosure, the "halide solid electrolyte" is a solid electrolyte containing a halogen element and not containing sulfur.

The sulfide solid electrolyte may be any of the sulfide solid electrolytes mentioned above as examples of the third solid electrolyte material.

Examples of the oxide solid electrolyte include NASICON-type solid electrolytes typified by $LiTi_2(PO_4)_3$ and element-substituted derivatives thereof; $(LaLi)TiO_3$-system perovskite-type solid electrolytes; LISICON-type solid electrolytes typified by $Li_{14}ZnGe_4O_{16}$, $Li_4SiO_4$, $LiGeO_4$, and element-substituted derivatives thereof; garnet-type solid electrolytes typified by $Li_7La_3Zr_2O_{12}$ and element-substituted derivatives thereof; $Li_3PO_4$ and N-substituted derivatives thereof; and glass or glass-ceramics that are based on a Li—B—O compound such as $LiBO_2$ or $Li_3BO_3$ and which contains $Li_2SO_4$, $Li_2CO_3$, or the like added thereto.

The halide solid electrolyte may be any of the compounds represented by composition formula (1), which are mentioned above as examples of the first solid electrolyte material. The halide solid electrolyte may be any of the compounds represented by composition formula (2), which are mentioned above as examples of the second solid electrolyte material. The halide solid electrolyte may be any of the compounds represented by composition formula (3), which are mentioned above as examples of the third solid electrolyte material. The halide solid electrolyte may be the compound containing Li, M4, X4, and O (oxygen), described above. The halide solid electrolyte may be a compound represented by composition formula (4).

Examples of the polymer solid electrolyte include compounds of a polymeric compound and a lithium salt. The polymeric compound may have an ethylene oxide structure. Polymeric compounds having an ethylene oxide structure can contain large amounts of a lithium salt. Accordingly, the ionic conductivity can be enhanced. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One or more lithium salts selected from the above-mentioned lithium salts may be used.

Examples of the complex hydride solid electrolyte include $LiBH_4$—LiI and $LiBH_4$—$P_2S_5$.

There are no limitations on a shape of the solid electrolyte materials to be included in the battery 1000. Examples of the shape of the solid electrolyte materials include acicular shapes, spherical shapes, and ellipsoidal shapes. The shape of the solid electrolyte materials may be, for example, a particulate shape.

The positive electrode 201 includes, as a positive electrode active material, for example, a material that has a property of occluding and releasing metal ions (e.g., lithium ions). Examples of the positive electrode active material include lithium transition metal oxides, lithium transition metal fluorides, lithium polyanion materials, lithium fluorinated polyanion materials, lithium transition metal sulfides, lithium transition metal oxysulfides, and lithium transition metal oxynitrides. Examples of the lithium transition metal oxides include Li(Ni, Co, Al)$O_2$, Li(Ni, Co, Mn)$O_2$, and $LiCoO_2$. In instances where a lithium transition metal oxide is used as a positive electrode active material, the cost of production can be reduced, and an average discharge voltage can be increased. The positive electrode active material may be lithium nickel cobalt manganese oxide so that an energy density of the battery can be increased. For example, the positive electrode active material may be Li(Ni, Co, Mn)$O_2$.

When a solid electrolyte material included in the positive electrode 201 has a particulate shape (e.g., a spherical shape), the solid electrolyte material may have a median diameter of less than or equal to 100 µm. When the median diameter of the solid electrolyte material is less than or equal to 100 µm, the positive electrode active material and the solid electrolyte material can form a favorable state of dispersion in the positive electrode 201. Consequently, the charge-discharge characteristics of the battery 1000 are improved.

The median diameter of the solid electrolyte material included in the positive electrode 201 may be less than a median diameter of the positive electrode active material. In this case, the solid electrolyte material and the positive electrode active material can form a favorable state of dispersion.

The median diameter of the positive electrode active material may be greater than or equal to 0.1 µm and less than or equal to 100 µm. When the median diameter of the positive electrode active material is greater than or equal to 0.1 µm, the positive electrode active material and the solid electrolyte material can form a favorable state of dispersion in the positive electrode 201. Accordingly, the charge-discharge characteristics of the battery 1000 are improved. When the median diameter of the positive electrode active material is less than or equal to 100 µm, a lithium diffusion rate in the positive electrode active material is high. As a result, the battery 1000 can provide high-power performance.

In the present specification, the median diameter of a particle is a particle diameter (d50) corresponding to an accumulated volume of 50%, which is determined from a particle size distribution measured on a volume basis by using a laser diffraction light scattering method. The particle size distribution can also be measured by using an image analyzer, for example. The same applies to other materials.

Regarding a volume ratio v1:100−v1, 30≤v1≤95 may be satisfied, where v1:100−v1 is a volume ratio between the positive electrode active material and the solid electrolyte material included in the positive electrode 201. Here, v1 represents a volume ratio of the positive electrode active material relative to a total volume of the positive electrode active material and the solid electrolyte material included in the positive electrode 201, with the total volume being taken as 100. When 30≤v1 is satisfied, a sufficient energy density of the battery can be ensured. When v1≤95 is satisfied, the battery 1000 can provide high-power performance.

The positive electrode 201 may have a thickness of greater than or equal to 10 µm and less than or equal to 500 µm. When the thickness of the positive electrode 201 is greater than or equal to 10 µm, a sufficient energy density of the battery can be ensured. When the thickness of the positive electrode 201 is less than or equal to 500 µm, the battery 1000 can provide high-power performance.

The first electrolyte layer 101, the second electrolyte layer 102, and the third electrolyte layer 103 may each have a thickness of greater than or equal to 0.1 µm and less than or equal to 300 µm. When the thicknesses of the first electrolyte layer 101, the second electrolyte layer 102, and the third electrolyte layer 103 are each greater than or equal to 0.1 µm, short-circuiting between the positive electrode 201 and the negative electrode 202 is unlikely to occur. When the thicknesses of the first electrolyte layer 101, the second electrolyte layer 102, and the third electrolyte layer 103 are each less than or equal to 300 µm, the battery 1000 can provide high-power performance.

The thickness of the second electrolyte layer 102 may be less than the thickness of the first electrolyte layer 101 and less than the thickness of the third electrolyte layer 103. With this configuration, delamination between the different types of solid electrolyte layers can be inhibited by the second electrolyte layer 102. Furthermore, resistance of the second electrolyte layer 102 is reduced, and, consequently, the power characteristics of the battery 1000 are improved.

The negative electrode 202 includes, as a negative electrode active material, for example, a material that has a property of occluding and releasing metal ions (e.g., lithium ions). Examples of the negative electrode active material include metal materials, carbon materials, oxides, nitrides, tin compounds, and silicon compounds. The metal materials may be elemental metals. The metal materials may be alloys. Examples of the metal materials include lithium metals and lithium alloys. Examples of the carbon materials include natural graphite, coke, partially-graphitized carbon, carbon fibers, spherical carbon, artificial graphite, and amorphous carbon. In instances where silicon (Si), tin (Sn), a silicon compound, a tin compound, and/or the like are used, a capacity density is improved.

The negative electrode active material may have a median diameter of greater than or equal to 0.1 µm and less than or equal to 100 µm. When the median diameter of the negative electrode active material is greater than or equal to 0.1 µm, the negative electrode active material and the solid electrolyte material can form a favorable state of dispersion in the negative electrode 202. Consequently, the charge-discharge characteristics of the battery 1000 are improved. When the median diameter of the negative electrode active material is less than or equal to 100 µm, a lithium diffusion rate in the negative electrode active material is high. As a result, the battery 1000 can provide high-power performance.

The median diameter of the negative electrode active material may be greater than a median diameter of a solid electrolyte material. In this case, the negative electrode active material and the solid electrolyte can form a favorable state of dispersion.

Regarding a volume ratio v2:100-v2, 30≤v2≤95 may be satisfied, where v2:100−v2 is a volume ratio between the negative electrode active material and the solid electrolyte material included in the negative electrode 202. Here, v2 represents a volume ratio of the negative electrode active material relative to a total volume of the negative electrode active material and the solid electrolyte material included in the negative electrode 202, with the total volume being taken as 100. When 30≤v2 is satisfied, a sufficient energy density of the battery can be ensured. When v2≤95 is satisfied, the battery 1000 can provide high-power performance.

The negative electrode 202 may have a thickness of greater than or equal to 10 and less than or equal to 500 µm. When the thickness of the negative electrode 202 is greater than or equal to 10 µm, a sufficient energy density of the battery can be ensured. When the thickness of the negative electrode 202 is less than or equal to 500 µm, the battery 1000 can provide high-power performance.

The positive electrode active material and the negative electrode active material may be coated with a coating material so as to reduce interfacial resistance between each of the active materials and the solid electrolyte material. The coating material may be a material having low electron conductivity. The coating material may be an oxide material, an oxide solid electrolyte, and/or the like.

Examples of the oxide material include $SiO_2$, $Al_2O_3$, $TiO_2$, $B_2O_3$, $Nb_2O_5$, $WO_3$, and $ZrO_2$.

Examples of oxide solid electrolytes that can be used as the coating material include Li—Nb—O compounds, such as $LiNbO_3$; Li—B—O compounds, such as $LiBO_2$ and $Li_3BO_3$; Li—Al—O compounds, such as $LiAlO_2$; Li—Si—O compounds, such as $Li_4SiO_4$; $Li_2SO_4$; Li—Ti—O compounds, such as $Li_4Ti_5O_{12}$; Li—Zr—O compounds, such as $Li_2ZrO_3$; Li—Mo—O compounds, such as $Li_2MoO_3$; Li—V—O compounds, such as $LiV_2O_5$; and Li—W—O compounds, such as $Li_2WO_4$. Oxide solid electrolytes have high ionic conductivity. Oxide solid electrolytes have excellent high-potential stability. Accordingly, in instances where an oxide solid electrolyte is used as the coating material, the charge-discharge efficiency of the battery 1000 is further improved.

A non-aqueous electrolyte solution, a gel electrolyte, or an ionic liquid may be included in at least one selected from the group consisting of the positive electrode 201, the first electrolyte layer 101, the second electrolyte layer 102, the third electrolyte layer 103, and the negative electrode 202, to facilitate the transfer of lithium ions, thereby improving the power characteristics of the battery 1000.

The non-aqueous electrolyte solution includes a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate. Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, fluoromethyl propionate, fluorobenzene, fluoroethyl methyl carbonate, and fluorodimethylene carbonate. As the non-aqueous solvent, one non-aqueous solvent selected from these may be used alone, or a mixture of two or more non-aqueous solvents selected from these may be used.

The non-aqueous electrolyte solution may include at least one fluorinated solvent selected from the group consisting of fluoroethylene carbonate, fluoromethyl propionate, fluorobenzene, fluoroethyl methyl carbonate, and fluorodimethylene carbonate.

Examples of the lithium salt include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, one lithium salt selected from these may be used alone, or a mixture of two or more lithium salts selected from these may be used. The lithium salt has a concentration within a range of, for example, greater than or equal to 0.5 mol/liter and less than or equal to 2 mol/liter.

The gel electrolyte may be a polymeric material impregnated with a non-aqueous electrolyte solution. Examples of the polymeric material include polyethylene oxide, polyacrylonitrile, polyvinylidene fluoride, polymethylmethacrylate, and polymers having an ethylene oxide linkage.

Examples of a cation that can form the ionic liquid include aliphatic chain quaternary salts, such as tetraalkylammonium and tetraalkylphosphonium; aliphatic cyclic ammonium, such as pyrrolidiniums, morpholiniums, imidazoliniums, tetrahydropyrimidiniums, piperaziniums, and piperidiniums; and nitrogen-containing heterocyclic aromatic cations, such as pyridiniums and imidazoliums. Examples of an anion that can form the ionic liquid include $PF_6^-$, $BF_4^-$, $SbF_6^-$, $AsF_6^-$, $SO_3CF_3^-$, $N(SO_2F)_2^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

A binding agent may be included in at least one selected from the group consisting of the positive electrode 201, the first electrolyte layer 101, the second electrolyte layer 102, the third electrolyte layer 103, and the negative electrode 202, to improve adhesion between particles. The binding agent is used to improve the binding properties of the materials that form the electrodes. Examples of the binding agent include polyvinylidene fluoride, polytetrafluoroethylene, polyethylene, polypropylene, aramid resins, polyamides, polyimides, polyamide-imides, polyacrylonitrile, polyacrylic acids, poly(methyl acrylate), poly(ethyl acrylate), poly(hexyl acrylate), polymethacrylic acids, poly(methyl methacrylate), poly(ethyl methacrylate), poly(hexyl methacrylate), polyvinyl acetate, polyvinylpyrrolidone, polyethers, polyether sulfones, hexafluoropolypropylene, styrene butadiene rubber, and carboxymethyl cellulose. The binding agent may be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acids, and hexadiene. A mixture of two or more materials selected from the above-mentioned materials may be used as the binding agent.

A conductive additive may be included in at least one of the positive electrode 201 or the negative electrode 202 to enhance electron conductivity. Examples of the conductive additive include graphites, such as natural graphite and artificial graphite; carbon blacks, such as acetylene black and Ketjen black; conductive fibers, such as carbon fibers and metal fibers; carbon fluoride; metal powders, such as aluminum powders; conductive whiskers, such as zinc oxide whiskers and potassium titanate whiskers; conductive metal oxides, such as titanium oxide; and conductive polymers, such as polyaniline, polypyrrole, and polythiophene. In instances where a carbon conductive additive is used as the conductive additive, a cost reduction can be achieved.

Examples of a shape of the battery 1000 include coin shapes, cylindrical shapes, prismatic shapes, sheet shapes, button shapes, flat shapes, and stack shapes.

The battery 1000 may be a stack of batteries 1000 each including the positive electrode 201, the first electrolyte layer 101, the second electrolyte layer 102, the third electrolyte layer 103, and the negative electrode 202, with a current collector being disposed between adjacent batteries 1000. In instances where multiple batteries are electrically connected in series, a voltage of the batteries can be increased. In instances where multiple batteries are electrically connected in parallel, a capacity of the batteries can be increased. In instances where multiple batteries are electrically connected in series and in parallel, a voltage and a capacity of the batteries can be increased.

Method for Producing Solid Electrolyte Material

The solid electrolyte material represented by composition formula (1) can be produced, for example, by using the following method.

First, several types of raw material powders of binary halides are prepared in accordance with the target composition. The "binary halide" is a compound formed of two elements including a halogen element. For example, when $Li_3YCl_6$ is to be produced, a raw material powder of LiCl and a raw material powder of $YCl_3$ are prepared in a molar ratio of 3:1. In this instance, the elements of M1 and X1 of composition formula (1) are determined by the selection of the types of the raw material powders. Furthermore, the values of $\alpha1$, $\beta1$, and $\gamma1$ of composition formula (1) are determined by adjusting the types of the raw material powders, the compounding ratio between the raw material powders, and the synthesis process.

After the raw material powders are mixed together and ground, the raw material powders are caused to react with each other by using a mechanochemical milling method. Alternatively, after the raw material powders are mixed together and ground, the raw material powders may be sintered in a vacuum or in an inert atmosphere. The sintering can be carried out at a temperature of greater than or equal to 100° C. and less than or equal to 400° C. for 1 hour or more, for example. By using any of these methods, the solid electrolyte material can be obtained.

Note that the form of the crystalline phase (i.e., the crystal structure) of the solid electrolyte material can be determined by adjusting the method by which the raw material powders are reacted together and the reaction conditions.

Method for Producing Battery

A battery 1000 that uses solid electrolyte materials produced as described above can be produced, for example, by using the following method.

Figure 2:
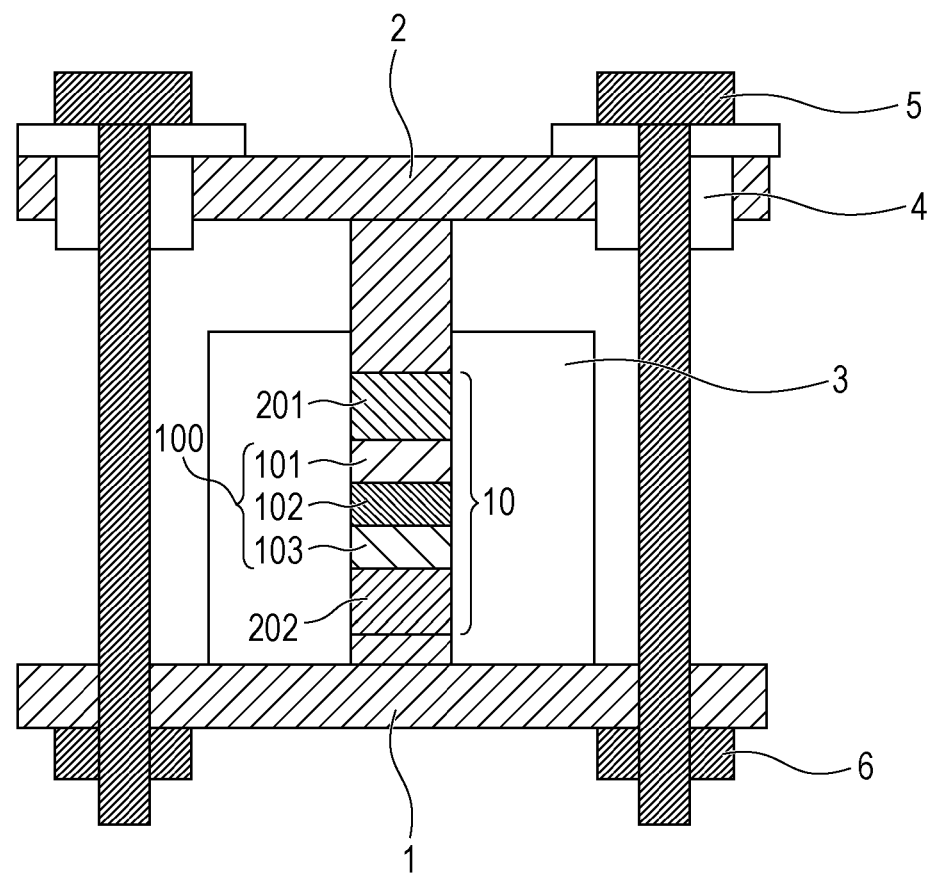
FIG. 2 is a diagram illustrating a method for producing a battery.

FIG. 2 is a diagram illustrating a method for producing the battery 1000. As illustrated in FIG. 2, a lower die 1 is inserted into an insulating tube 3. A powder of a third solid electrolyte material is placed into the insulating tube 3. An upper die 2 is inserted into the insulating tube 3 to press the powder of the third solid electrolyte material to form a third electrolyte layer 103. The upper die 2 is removed, and a powder of a second solid electrolyte material is added into the insulating tube 3. The upper die 2 is reinserted into the insulating tube 3 to press the powder of the second solid electrolyte material to form a second electrolyte layer 102 on the third electrolyte layer 103. The upper die 2 is removed, and a powder of a first solid electrolyte material is added into the insulating tube 3. The upper die 2 is reinserted into the insulating tube 3 to press the powder of the first solid electrolyte material to form a first electrolyte layer 101 on the second electrolyte layer 102. The upper die 2 is removed, and a powder of a positive electrode active material is added into the insulating tube 3. The upper die 2 is reinserted into the insulating tube 3 to press the powder of the positive electrode active material to form a positive electrode 201 on the first electrolyte layer 101.

After the positive electrode 201 is formed, the lower die 1 is removed, and a powder of a negative electrode active material and a metal foil are added into the insulating tube 3. The metal foil is an indium metal foil punched into a disc shape or a lithium metal foil punched into a disc shape. The lower die 1 is reinserted to press the powder of the negative electrode active material and the indium or lithium metal foil to form a negative electrode 202. Accordingly, a power generation element 10 is formed.

After the power generation element 10 is formed, the lower die 1 and the upper die 2 are secured with insulating tubes 4, bolts 5, and nuts 6. Accordingly, the battery 1000 can be obtained.

The battery of the present disclosure can be used, for example, as an all-solid-state lithium ion secondary battery.

What is claimed is:

1. A battery comprising a positive electrode, a first electrolyte layer, a second electrolyte layer, a third electrolyte layer, and a negative electrode arranged in the order stated, wherein:
   the first electrolyte layer includes a first solid electrolyte material,
   the second electrolyte layer includes a second solid electrolyte material,
   the third electrolyte layer includes a third solid electrolyte material,
   the first solid electrolyte material and the third solid electrolyte material are materials different from each other,
   the first solid electrolyte material is represented by composition formula (A7) below,

   $$Li_{3-3\delta-a}Y_{1+\delta-a}Me_aCl_{6-x-y}Br_xI_y \quad \text{formula (A7)}$$

where Me is at least one selected from the group consisting of Zr, Hf, and Ti, and
   $-1<\delta<1$, $0<a<1.5$, $0<(3-3\delta-a)$, $0<(1+\delta-a)$, $0 \leq x<6$, $0 \leq y<6$, and $(x+y)<6$ are satisfied,
   the second solid electrolyte material includes Li, M2 and X2, where
   M2 is at least one selected from the group consisting of metalloid elements and metal elements other than Li, and
   X2 is at least one selected from the group consisting of F, Cl, Br, and I,
   the third solid electrolyte material is represented by composition formula (A2) below,

   $$Li_3YX_6 \quad \text{formula (A2)}$$

where X contains Cl, and
   a relationship of $(R3+R4)>(R1+R2)$ and a relationship of $(R3+R4)>(R5+R6)$ are satisfied, where
   R1 is defined as a ratio of an amount of substance of Br to a total amount of substance of at least one halogen in the first solid electrolyte material,
   R2 is defined as a ratio of an amount of substance of I to the total amount of substance of the at least one halogen in the first solid electrolyte material,
   R3 is defined as a ratio of an amount of substance of Br to a total amount of substance of at least one halogen in the second solid electrolyte material,
   R4 is defined as a ratio of an amount of substance of I to the total amount of substance of the at least one halogen in the second solid electrolyte material,
   R5 is defined as a ratio of an amount of substance of Br to a total amount of substance of at least one halogen in the third solid electrolyte material, and
   R6 is defined as a ratio of an amount of substance of I to the total amount of substance of the at least one halogen in the third solid electrolyte material.

2. The battery according to claim 1, wherein X further contains at least one of Br and I.

3. The battery according to claim 1, wherein the second solid electrolyte material is a material represented by composition formula (2) below, $$Li_{\alpha 2}M2_{\beta 2}X2_{\gamma 2} \quad \text{formula (2)}$$

where $\alpha 2$, $\beta 2$, and $\gamma 2$ are each a value greater than 0.

4. The battery according to claim 1, wherein M2 includes yttrium.

5. The battery according to claim 1, wherein the second electrolyte layer has a thickness that is less than a thickness of each of the first electrolyte layer and the third electrolyte layer.

* * * * *